US012296778B1

United States Patent
Hwang et al.

(10) Patent No.: US 12,296,778 B1
(45) Date of Patent: May 13, 2025

(54) VEHICLE PASSENGER PROTECTION SYSTEM

(71) Applicants: Hyundai Motor Company, Seoul (KR); Kia Corporation, Seoul (KR)

(72) Inventors: Yun Jeong Hwang, Changwon-Si (KR); Joon Ho Lee, Gangnam-Gu (KR); Jun U Kim, Seongnam-Si (KR); Ji Hyun Song, Suwon-Si (KR); Dong Hyun Kim, Hanam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/920,541

(22) Filed: Oct. 18, 2024

(30) Foreign Application Priority Data

Jan. 5, 2024 (KR) .................. 10-2024-0002183

(51) Int. Cl.
*B60R 21/2334* (2011.01)
*B60R 21/015* (2006.01)
*B60R 21/017* (2006.01)
*B60R 21/16* (2006.01)
*B60R 21/231* (2011.01)

(52) U.S. Cl.
CPC .... *B60R 21/2334* (2013.01); *B60R 21/01512* (2014.10); *B60R 21/017* (2013.01); *B60R 21/23138* (2013.01); *B60R 2021/161* (2013.01)

(58) Field of Classification Search
CPC .............. B60R 21/2334; B60R 21/017; B60R 21/23138; B60R 2021/161; B60R 21/16
See application file for complete search history.

(56) References Cited

U.S. PATENT DOCUMENTS

| | | | |
|---|---|---|---|
| 10,513,206 B2* | 12/2019 | Spahn | B60N 2/4279 |
| 10,625,704 B2* | 4/2020 | Dry | B60R 21/207 |
| 10,926,733 B2* | 2/2021 | Dry | B60R 21/23138 |
| 11,400,879 B2* | 8/2022 | Kang | B60N 2/42727 |
| 11,667,258 B1* | 6/2023 | Golman | B60R 21/214 |
| | | | 280/728.1 |

* cited by examiner

*Primary Examiner* — Faye M Fleming
(74) *Attorney, Agent, or Firm* — Morgan, Lewis & Bockius LLP

(57) ABSTRACT

A vehicle passenger protection system includes: a seat provided in an internal space of a vehicle; a mobile crash pad provided in the internal space of the vehicle to be movable toward the seat, wherein the mobile crash pad includes a first airbag module provided inside the vehicle and including a first airbag cushion, and a guide rail engaged to the first airbag cushion and configured to serve as a deployment path of the first airbag cushion when the first airbag cushion is deployed; and a controller operably connected to the mobile crash pad and configured to predict a vehicle accident, and move the mobile crash pad toward the seat and deploy the first airbag cushion in the mobile crash pad when an accident is expected.

19 Claims, 2 Drawing Sheets

VEHICLE PASSENGER PROTECTION SYSTEM

CROSS-REFERENCE TO RELATED APPLICATION(S)

The present application claims priority to Korean Patent Application No. 10-2024-0002183, filed on Jan. 5, 2024, the entire contents of which is incorporated herein for all purposes by this reference.

BACKGROUND OF THE PRESENT DISCLOSURE

Field of the Present Disclosure

The present disclosure relates to a vehicle passenger protection system which is configured for protecting a vehicle passenger from a vehicle accident.

Description of Related Art

With the development of technologies for detecting an external environment and data processing, the realization of complete autonomous driving of vehicles is imminent. With the realization of complete autonomous driving, vehicles may break away from the concept of simple means of transportation or movement and may be changed into various spaces.

Seats may be freely movable within a vehicle, and accordingly, there is a need to develop a safety device which is capable of ensuring the safety of passengers depending on various seat positions.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle passenger protection system which is configured for safely protecting a passenger in the internal space of a vehicle where seats are freely movable.

In view of the foregoing, a vehicle passenger protection system according to an exemplary embodiment of the present disclosure includes: a seat provided in an internal space of a vehicle; a mobile crash pad provided in the internal space of the vehicle to be movable toward the seat, wherein the mobile crash pad includes a first airbag module provided inside the vehicle and including a first airbag cushion, and a guide rail engaged to the first airbag cushion and configured to serve as a deployment path of the first airbag cushion when the first airbag cushion is deployed; and a controller operably connected to the mobile crash pad and configured to predict a vehicle accident, and move the mobile crash pad toward the seat and deploy the first airbag cushion in the mobile crash pad when an accident is expected.

The seat may be provided to be movable forward and rearward as well as left and right in the internal space of the vehicle.

The mobile crash pad may include a housing that includes a closed cross-sectional shape and defines an appearance of the mobile crash pad, and the floor of the vehicle may be provided with a cradle including a moving rail coupled to the housing and configured to serve as a movement path for the housing.

The housing may extend in the height direction of the vehicle in the closed cross-sectional shape. Inside the housing, the first airbag module is accommodated, and outside the housing, the guide rail configured to serve as the deployment path for the first airbag cushion is provided.

The cradle may include a first portion extending in a longitudinal direction or a width direction of the vehicle, and a second portion extending in the height direction to be coupled to the first portion.

The seat may be provided inside the cradle, and the seat may be provided to be movable forward and rearward as well as left and right inside the cradle.

The mobile crash pad may be provided with a sensor configured to detect whether or not a passenger is seated on the seat, and the controller may be further configured to move the mobile crash pad toward the seat and to deploy the first airbag cushion within the mobile crash pad when a passenger is seated on the seat and the vehicle accident is expected.

The controller may be further configured to move the mobile crash pad to a point which is a predetermined distance away from a passenger seated on the seat when the vehicle accident is expected.

The controller may be further configured to move the mobile crash pad to its previous location when the vehicle accident is expected but does not occur.

The controller may be further configured to deploy the first airbag cushion in the mobile crash pad when the vehicle accident occurs.

The seat may be provided with a second airbag module, and the controller may be further configured to deploy the second airbag cushion to cover a portion of a passenger's body when the vehicle accident occurs.

The controller may be further configured to move the mobile crash pad to a point which is a predetermined distance away from the passenger seated on the seat when the vehicle accident is expected, and the controller may be further configured to deploy the first airbag cushion and the second airbag cushion when the vehicle accident occurs, and to move the mobile crash pad toward the passenger so that the first airbag cushion and the second airbag cushion are brought into contact with each other when the deployment of the first airbag cushion is completed.

The mobile crash pad may be provided with a sensor configured to detect whether or not a passenger is seated on the seat, and the controller may be further configured to determine the passenger's condition via the sensor when the vehicle accident occurs.

The mobile crash pad may be provided with a speaker.

The controller may be further configured to transmit white noise through the speaker when the vehicle accident occurs.

The vehicle passenger protection system according to an exemplary embodiment of the present disclosure has an advantage in that a passenger may be safely protected from a vehicle accident in the internal space of the vehicle where the position of the seat may be changed.

, with the interaction between the first airbag cushion and the second airbag cushion, the passenger's body may be safely protected from a vehicle accident regardless of the passenger's body size, and by the first airbag cushion, the passenger may be suppressed from being injured by an object flying due to a vehicle accident.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
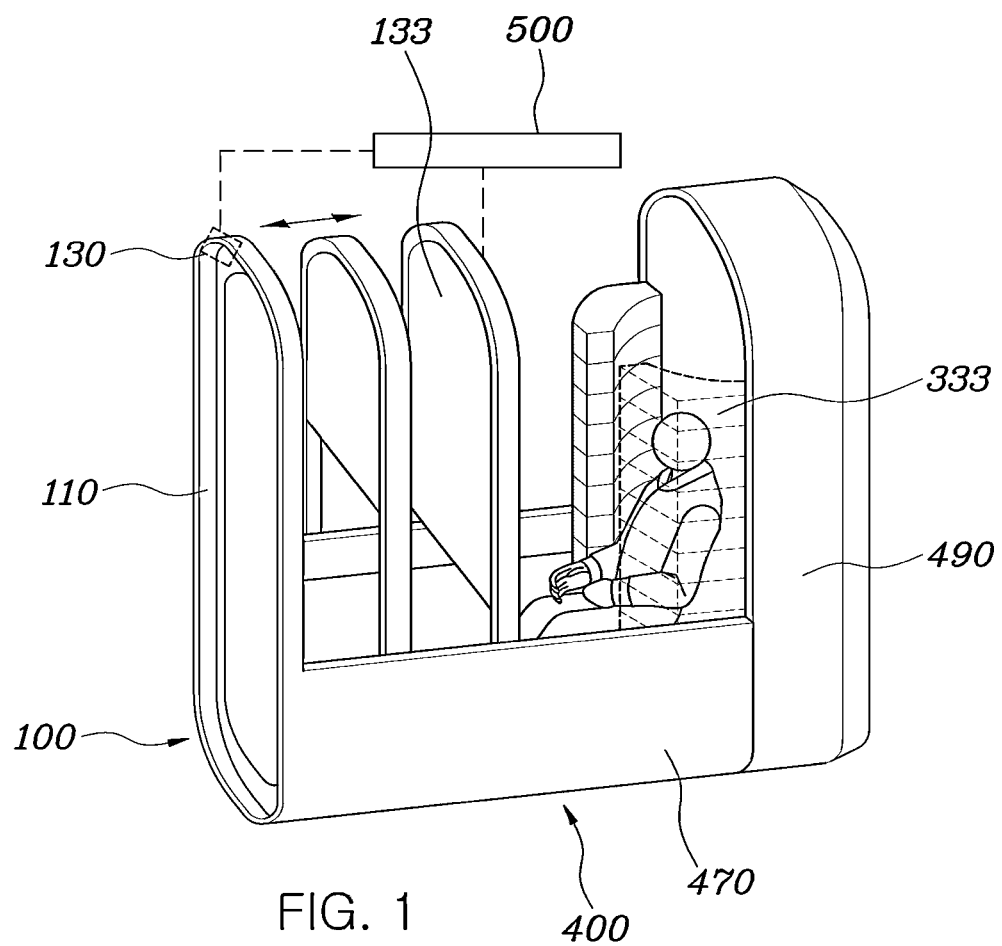
FIG. 1 is a view exemplarily illustrating a vehicle passenger protection system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments set forth herein will be described in detail with reference to the accompanying drawings, and the same or similar elements are provided the same and similar reference numerals regardless of figure numbers, so duplicate descriptions thereof will be omitted.

In describing the exemplary embodiments set forth herein, a detailed description of known functions or configurations incorporated herein will be omitted when it is determined that the description may make the subject matter of the exemplary embodiments set forth herein unclear. Furthermore, it should be appreciated that the accompanying drawings are provided only for the sake of easy understanding of the exemplary embodiments set forth herein, and the technical idea of the present disclosure is not limited to the accompanying drawings and includes all modifications, equivalents, or alternatives falling within the spirit and scope of the present disclosure.

Terms including an ordinal number such as "a first" and "a second" may be used to describe various elements, but the elements are not limited to the terms. The above terms are used merely for distinguishing one element from other elements.

A singular expression may include a plural expression unless they are definitely different in a context.

As used herein, the expression "comprise", "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

The terms "module" and "unit" used for the elements in the following description are provided or interchangeably used in consideration of only the ease of writing the specification, and do not have distinct meanings or roles by themselves.

In the case where an element is referred to as being "connected" or "coupled" to any other elements, it should be understood that another element may be provided therebetween, as well as that the element may be directly connected or coupled to the other elements. Contrarily, in the case where an element is referred to as being "directly connected" or "directly coupled" to any other element, it should be understood that no other element exists therebetween.

A controller may include a communication device configured to communicate with a sensor or another control unit, a memory configured to store an operation system, a logic command, or input/output information, and at least one processor configured to perform determination, calculation, decision or the like which are required for responsible function controlling.

Figure 2:
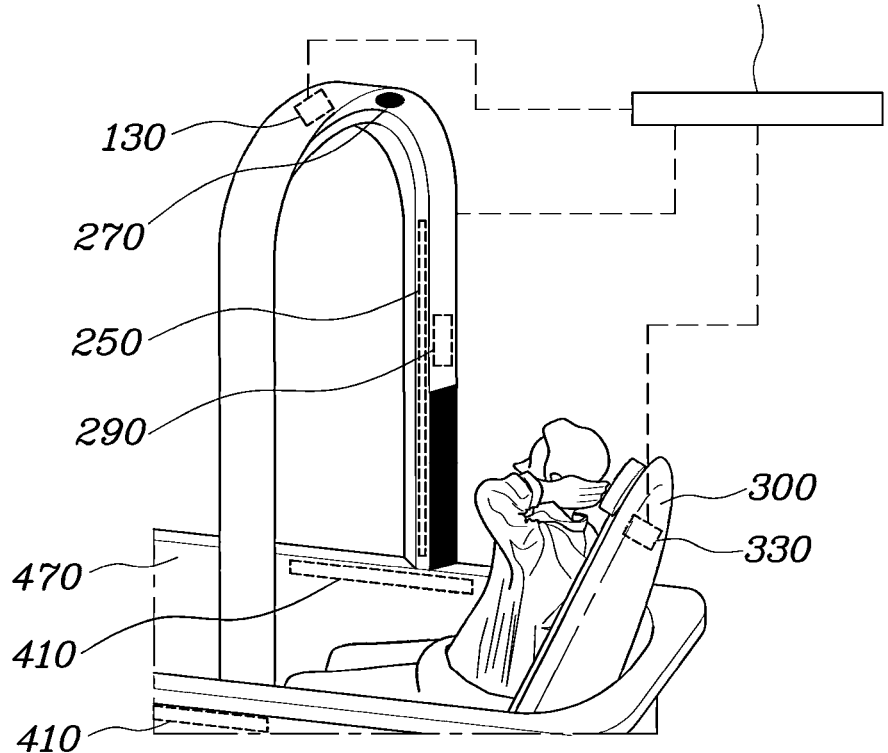
FIG. 2 is a view exemplarily illustrating the vehicle passenger protection system in which the cradle is partially omitted.

FIG. 1 is a view exemplarily illustrating a vehicle passenger protection system according to an exemplary embodiment of the present disclosure, and FIG. 2 is a view exemplarily illustrating the vehicle passenger protection system in which the cradle is partially omitted.

A seat provided in the internal space of a vehicle is freely movable forward and rearward as well as left and right in the internal space of the vehicle. With the development of autonomous driving technology, the interiors of vehicles may be changed into various spaces. Accordingly, it is possible to help to change a vehicle into various spaces by changing various seat positions.

Meanwhile, referring to FIG. 1 and FIG. 2, a mobile crash pad 100 of the present disclosure is provided in the internal space of a vehicle and is movable toward the seat 300. A first airbag module 130 is provided inside the mobile crash pad 100, and when a vehicle accident occurs, a first airbag cushion 133 included in the first airbag module 130 is deployed to protect a passenger from the accident.

The mobile crash pad 100 is configured to protect the passenger by moving in response to the movement of the seat 300, that is, the movement of the passenger seated on the seat 300 of the vehicle.

It is difficult for an airbag device fixed at one point in the internal space of a vehicle to respond to changes in the passenger's position due to seat movement. Therefore, in an exemplary embodiment of the present disclosure, the mobile crash pad 100 in which the first airbag cushion 133 is built is provided in the internal space of the vehicle to optimally respond to a vehicle accident regardless of the passenger's position.

The first airbag module 130 may be provided inside the mobile crash pad 100, and the first airbag module 130 may include a folded first airbag cushion 133 and a first inflator configured to supply gas so that the first airbag cushion 133 may be deployed.

The controller 500 is configured to predict a vehicle accident. An accident prediction system provided in the controller 500 may monitor the driving situation of the vehicle and detect the possibility of a collision with another vehicle or an external object in advance.

Devices such as radio detection and ranging (RADAR)s and LiDARs are provided outside the vehicle to detect the distances between the vehicle and other vehicles and the distances between external objects and the vehicle in real time, and devices such as cameras are provided to maintain lane, recognize traffic signals, and detect the presence of other vehicles in real time.

The controller 500 may be configured to predict a vehicle accident in advance via an accident prediction system and prevent the vehicle accident by operating an emergency braking system mounted on the vehicle. However, when an accident is expected to occur despite the operation of the emergency braking system due to the sudden intervention of another vehicle or the appearance of an obstacle, it is necessary to protect a passenger in the vehicle.

In the situation where an accident is expected to occur, the controller 500 may protect the passenger by moving the mobile crash pad 100 toward the seat 300 on which the passenger is seated, and deploying the first airbag cushion 133 provided in the mobile crash pad 100.

Here, the deployed first airbag cushion 133 may protect the passenger from flying objects. In the internal space of the vehicle, there may be devices provided for the convenience of passengers or objects arbitrarily placed by passengers, and the vehicle may be provided with windows that are easy to break due to external impacts. Furthermore, with the development of autonomous driving technology, small-sized displays gradually have become larger, and a plurality of displays have been provided inside vehicles, so passengers may be injured by fragments generated when the displays break.

The first airbag cushion 133 exists to protect a passenger from the flying objects.

The second airbag cushion 333 directly protects the passenger from external shocks, which will be described later.

On the other hand, the mobile crash pad 100 may include a housing 110 that includes a closed cross-sectional shape and defines the appearance of the mobile crash pad 100, and the floor of the vehicle may be provided with a cradle 400 in which moving rails 410 are provided to serve as a movement path of the housing 110.

Referring to FIG. 1, a seat 300 may be provided inside the cradle portion 400 provided on the floor of the vehicle. The seat 300 may be provided to be movable forward and rearward as well as left and right inside the cradle portion 400.

The housing 110, which defines the appearance of the mobile crash pad 100, may be made in a closed cross-sectional shape and may have, for example an oval shape, as illustrated in FIG. 1. Polygonal shapes as well as a square may also possible.

That is, the housing 110 may extend in the height direction of the vehicle to form a closed cross-sectional shape, in which case the first airbag module 130 is accommodated inside the housing 110. The first airbag module 130 is accommodated at the top portion of the housing 110.

This is to minimize the resistance caused by external force applied to the first airbag cushion 133 so that the first airbag cushion 133 may be deployed rapidly, and when the first airbag module 130 is accommodated at the top portion of the housing, the direction in which the first airbag cushion 133 is deployed coincides with the direction in which gravity acts, enabling rapid deployment of the first airbag cushion 133.

The first airbag cushion 133 may be deployed along the closed cross-section of the housing 110. That is, a guide rail 250, which is configured as a deployment path of the first airbag cushion 133, is provided on the outside of the housing 110 to guide the deployment direction of the first airbag cushion 133.

In the instant case, known techniques, such as those of curtain airbags, may be applied to the first airbag cushion 133 and the guide rail 250. For example, at a plurality of points of the first airbag cushion 133, especially on the left and right sides of the first airbag cushion 133, a guide ring which is provided to penetrate the first airbag cushion 133 to be coupled to the first airbag cushion 133 may be provided. Furthermore, the guide rail 250 may be provided along the direction in which the housing 110 extends, and a sliding member that slides on the guide rail 250 and is connected to the guide ring may be provided on the guide rail 250.

Alternatively, a rod-shaped guide rod may be provided in the housing instead of the guide rail 250 to penetrate the guide ring to guide the deployment direction of the first airbag cushion 133.

Meanwhile, referring to FIG. 2, the moving rails 410 that serve as a movement path for the housing 110 may be provided in the cradle 400 provided on the floor of the vehicle. Both end portions of the housing 110 are coupled to the cradle 400, more specifically, to the moving rails 410. An electric motor may be provided inside the cradle 400 or the housing 110 to move the housing 110 on the moving rails 410.

To move the housing 110 on the moving rails 410, the moving rails 410 and the housing 110 may be coupled to each other in a ball screw type or a rack-and-pinion type, which are known in the art. When current is applied to the electric motor to operate the electric motor, the housing 110 may move on the moving rails 410 toward or away from the seat 300.

Meanwhile, the cradle portion 400 may include a first portion 470 extending in the length or width direction of the vehicle and a second portion 490 extending in the height direction of the vehicle and coupled to the first portion 470. The moving rails 410 may be provided on the first portion 470, and an operating device configured to adjust the distance of the mobile crash pad 100 and the volume level of the speaker 290 provided on the mobile crash pad 100 may be provided in the first portion 470.

The second portion 490 extends from one end portion of the first portion 470 in the height direction of the vehicle. A space is defined inside the second portion 490 so that a passenger may rest in the state of being seated on the seat 300, and even in the event of a vehicle accident, the passenger may be protected from objects flying from the rear side of the seat 300.

Meanwhile, the mobile crash pad 100 is provided with a sensor 270 configured to determine whether or not a passenger is seated on the seat 300, and when the passenger is seated on the seat and an accident is expected, the controller 500 may move the mobile crash pad 100 toward the seat 300 and deploy the first airbag cushion 133 within the mobile crash pad 100.

The sensor 270 may be a camera or a vision sensor, and the sensor 270 is provided on the upper side of the mobile crash pad 100 to determine whether or not there is a passenger seated on the seat.

Even if an accident occurs, when there is no seated passenger, it is meaningless to move the mobile crash pad 100 toward the seat 300 or deploy the first airbag cushion 133. Thus, the presence of a passenger is identified through the sensor 270.

At the present time, the presence of a passenger may be identified through the sensor 270 provided on the upper side of the mobile crash pad 100, but the presence of a passenger may be double-identified through a load cell built into the seat 300.

Meanwhile, when an accident is expected, the controller 500 moves the mobile crash pad 100 toward the seat 300 to a point which is a predetermined distance away from the passenger seated on the seat 300.

Here, when the first airbag cushion 133 is deployed, it is necessary for the controller 500 to move the mobile crash pad 100 to a point which is a predetermined distance away from the passenger to prevent the passenger from being injured due to the deployment force of the first airbag cushion 133.

Furthermore, because it is necessary to deploy the first airbag cushion 133 to protect the passenger when an accident occurs, it is desirable to move the mobile crash pad 100 to a point where the mobile crash pad is configured for reaching the passenger within 0.1 sect from the occurrence of the accident.

The moving point of the mobile crash pad 100 may be determined based on the operating speed of the electric motor, the size and position of the body of the passenger, and the like detected by the sensor 270.

If an accident is expected but does not occur, the controller 500 may move the mobile crash pad 100 to its previous position.

Meanwhile, a second airbag module 330 may be provided in the seat 300. The second airbag module 330 provided in the seat 300 may be a hug airbag module, and technologies known related to hug airbags may be applied in relation to the second airbag module 330. When an accident occurs, the controller 500 may deploy the second airbag cushion 333 to cover a portion of the passenger's body.

As described above, when an accident is expected, the controller 500 may move the mobile crash pad 100 to a point which is a predetermined distance away from the passenger seated on the seat, and when an accident occurs, the controller 500 may deploy the first airbag cushion 133 and the second airbag cushion 333.

The second airbag cushion 333 is configured for directly protecting the passenger from collision by being deployed to surround the passenger. However, the protection effect of the second airbag cushion 333 may vary depending on the body size of the passenger seated on the seat 300. When the body size of the passenger is small, there is an empty space between the second airbag cushion 333 and the passenger, which may make it difficult to completely protect the passenger from vibrations generated due to the vehicle accident.

Accordingly, the empty space between the passenger and the second airbag cushion 333 may be minimized by pressurizing the second airbag cushion 333 to a certain level or higher through contact between the first airbag cushion 133 and the second airbag cushion 333, and the passenger may be protected from flying objects by the first airbag cushion 133.

In the present way, the vehicle passenger protection system according to an exemplary embodiment of the present disclosure is configured for protecting a passenger from a vehicle accident through the interaction between the first airbag cushion 133 provided on the mobile crash pad 100 and the second airbag cushion 333 provided on the seat.

The second airbag cushion 333 directly protects the passenger from collision, and the first airbag cushion 133 protects the passenger from objects flying due to collision. Furthermore, problems which may arise due to the body size of a passenger and the size of the second airbag cushion 333 may be solved because the second airbag cushion 333 is pressurized by the first airbag cushion 133 to a certain level or higher.

Meanwhile, the sensor 270 provided on the mobile crash pad 100 may be configured to determine the condition of a passenger when an accident occurs. The sensor 270 can determine whether or not the current passenger is seriously injured by detecting the condition of the passenger's eyes, the passenger's posture, and the like, and when it is determined that the passenger is injured, the sensor may transmit vehicle information, accident information, and information related to the condition of the passenger and the position of vehicle to a service center of the manufacturer of the vehicle, a fire department adjacent to the vehicle accident location, and the like through a communication device.

Furthermore, even if the passenger is not injured, follow-up measures for the vehicle accident may be implemented by transmitting vehicle information, accident information, and information on the condition of the passenger and the position of the vehicle to a service center of the manufacturer of the vehicle.

Meanwhile, the mobile crash pad 100 may be provided with a speaker 290 that transmits sound. During normal driving of the vehicle, the mobile crash pad 100 may transmit music or sound for an image being played on a display in the vehicle. However, when an accident occurs, the controller 500 may protect the passenger's hearing by transmitting white noise through the speaker 290.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

Hereinafter, the fact that pieces of hardware are coupled operably may include the fact that a direct and/or indirect connection between the pieces of hardware is established by wired and/or wirelessly.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B".

Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle passenger protection system comprising:
    a seat provided in an internal space of a vehicle;
    a mobile crash pad provided in the internal space of the vehicle to be movable toward the seat, wherein the mobile crash pad includes:
        a first airbag module provided inside the vehicle and including a first airbag cushion; and
        a guide rail engaged to the first airbag cushion and configured to serve as a deployment path of the first airbag cushion in response that the first airbag cushion is deployed; and
    a controller operably connected to the mobile crash pad and configured to predict a vehicle accident, and move the mobile crash pad toward the seat and deploy the first airbag cushion in the mobile crash pad in response that the vehicle accident is expected.

2. The vehicle passenger protection system of claim 1, wherein the seat is provided to be movable forward and rearward as well as left and right in the internal space of the vehicle.

3. The vehicle passenger protection system of claim 1, wherein the mobile crash pad further includes a housing that includes a closed cross-section and defines an appearance of the mobile crash pad, and
    wherein a floor of the vehicle is provided with a cradle including a moving rail coupled to the housing and configured to serve as a movement path for the housing.

4. The vehicle passenger protection system of claim 3, wherein the housing extends in a height direction of the vehicle in the closed cross-section of the housing, and
    wherein, inside the housing, the first airbag module is accommodated, and outside the housing, the guide rail configured to serve as the deployment path for the first airbag cushion is provided.

5. The vehicle passenger protection system of claim 3, wherein the cradle includes:
 a first portion extending in a longitudinal direction or a width direction of the vehicle; and
 a second portion extending in a height direction of the vehicle and coupled to the first portion.

6. The vehicle passenger protection system of claim 3, wherein the seat is provided inside the cradle to be movable forward and rearward as well as left and right.

7. The vehicle passenger protection system of claim 1,
 wherein the mobile crash pad further includes a sensor configured to detect whether or not a passenger is seated on the seat, and
 wherein the controller operably connected to the sensor is further configured to move the mobile crash pad toward the seat and to deploy the first airbag cushion within the mobile crash pad in response that the passenger is seated on the seat and the vehicle accident is expected.

8. The vehicle passenger protection system of claim 1, wherein the controller is further configured to move the mobile crash pad to a point which is a predetermined distance away from a passenger seated on the seat in response that the vehicle accident is expected.

9. The vehicle passenger protection system of claim 8, wherein the controller is further configured to move the mobile crash pad to a previous location thereof in response that the vehicle accident is expected but does not occur.

10. The vehicle passenger protection system of claim 8, wherein the controller is further configured to deploy the first airbag cushion in the mobile crash pad in response that the vehicle accident occurs.

11. The vehicle passenger protection system of claim 1, wherein the seat is provided with a second airbag module including a second airbag cushion, and
 wherein the controller is further configured to deploy the second airbag cushion to cover a portion of a passenger's body in response that the vehicle accident occurs.

12. The vehicle passenger protection system of claim 11, wherein the controller is further configured to move the mobile crash pad to a point which is a predetermined distance away from the passenger seated on the seat in response that the vehicle accident is expected, and
 wherein the controller is further configured to deploy the first airbag cushion and the second airbag cushion in response that the vehicle accident occurs, and to move the mobile crash pad toward the passenger so that the first airbag cushion and the second airbag cushion are brought into contact with each other in response that the deployment of the first airbag cushion is completed.

13. The vehicle passenger protection system of claim 1,
 wherein the mobile crash pad is provided with a sensor configured to detect whether or not a passenger is seated, and
 wherein the controller operably connected to the sensor is further configured to determine a condition of the passenger via the sensor in response that the vehicle accident occurs.

14. The vehicle passenger protection system of claim 1, wherein the mobile crash pad is provided with a speaker.

15. The vehicle passenger protection system of claim 12, wherein the controller is further configured to transmit white noise via the speaker in response that the vehicle accident occurs.

16. A vehicle comprising:
 a seat provided in an internal space of the vehicle;
 a mobile crash pad provided in the internal space of the vehicle to be movable toward the seat, wherein the mobile crash pad includes:
  a first airbag module provided inside the vehicle and including a first airbag cushion; and
  a guide rail engaged to the first airbag cushion and configured to serve as a deployment path of the first airbag cushion in response that the first airbag cushion is deployed; and
 a controller operably connected to the mobile crash pad and configured to predict a vehicle accident, and move the mobile crash pad toward the seat and deploy the first airbag cushion in the mobile crash pad in response that the vehicle accident is expected.

17. The vehicle of claim, 16, further including:
 a moving rail connected to a housing of the mobile crash pad to serve as a movement path for the housing.

18. The vehicle of claim 17, wherein the controller is further configured to move the mobile crash pad to a point which is a predetermined distance away from a passenger seated on the seat in response that the vehicle accident is expected.

19. The vehicle of claim 17,
 wherein the seat is provided with a second airbag module including a second airbag cushion,
 wherein the controller is further configured to move the mobile crash pad to a point which is a predetermined distance away from a passenger seated on the seat in response that the vehicle accident is expected, and
 wherein the controller is further configured to deploy the first airbag cushion and the second airbag cushion in response that the vehicle accident occurs, and to move the mobile crash pad toward the passenger so that the first airbag cushion and the second airbag cushion are brought into contact with each other in response that the deployment of the first airbag cushion is completed.

\* \* \* \* \*